United States Patent [19]

Nagengast et al.

[11] Patent Number: 5,351,170
[45] Date of Patent: Sep. 27, 1994

[54] VEHICLE HEADLAMP ASSEMBLY

[75] Inventors: William E. Nagengast; David R. McMahan; Jan A. Wisler; Luis A. Mateos, all of Anderson; Michael W. Ballentine, Daleville, all of Ind.

[73] Assignee: General Motors Corporation, Detroit, Mich.

[21] Appl. No.: 169,464

[22] Filed: Dec. 20, 1993

[51] Int. Cl.$^5$ .................... B60Q 1/04; F21M 3/20
[52] U.S. Cl. ........................ 362/66; 362/80; 362/273; 362/289; 362/428
[58] Field of Search ............ 362/61, 66, 80, 273, 362/427, 288, 289, 428, 287, 418, 420, 421; 33/288, 335

[56] References Cited

U.S. PATENT DOCUMENTS

| | | | |
|---|---|---|---|
| 4,140,503 | 8/1992 | Lisak | 362/61 |
| 4,689,725 | 8/1987 | Saijo et al. | 362/66 |
| 5,023,759 | 6/1991 | Eckenrode | 362/66 |
| 5,063,480 | 11/1991 | McMahan et al. | 362/61 |
| 5,067,056 | 11/1991 | Suzuki et al. | 362/66 |
| 5,068,769 | 11/1991 | Umeda et al. | 362/61 |
| 5,077,642 | 12/1991 | Lisak | 362/66 |
| 5,091,829 | 2/1992 | Hendrischk et al. | 362/61 |
| 5,138,533 | 8/1992 | Daumueller | 362/66 |
| 5,138,542 | 8/1992 | Daumueller et al. | 362/420 |
| 5,150,958 | 9/1992 | Miyazawa et al. | 362/66 |
| 5,165,775 | 11/1992 | Lisak et al. | 362/273 X |
| 5,186,531 | 2/1993 | Ryder et al. | 362/66 |
| 5,186,532 | 2/1993 | Ryder et al. | 362/66 |
| 5,193,905 | 3/1993 | Edwards et al. | 362/425 |
| 5,197,799 | 3/1993 | Dehaene | 362/420 |
| 5,228,768 | 7/1993 | Suzuki | 362/273 X |

Primary Examiner—Ira S. Lazarus
Assistant Examiner—Thomas M. Sember
Attorney, Agent, or Firm—Ernest E. Helms

[57] ABSTRACT

A vehicle headlamp assembly provided with an adjustment device for adjusting the position of a lamp unit and wherein the adjustment device is combined with a rotatable recalibration arrangement that includes a position indicator in the form of a disk member provided with teeth at its periphery and in which the teeth of the disk member are shielded by a wall so as to prevent accidental movement of the disk member when the latter is positioned to indicate the aimed position of the lamp unit in the horizontal plane.

6 Claims, 3 Drawing Sheets

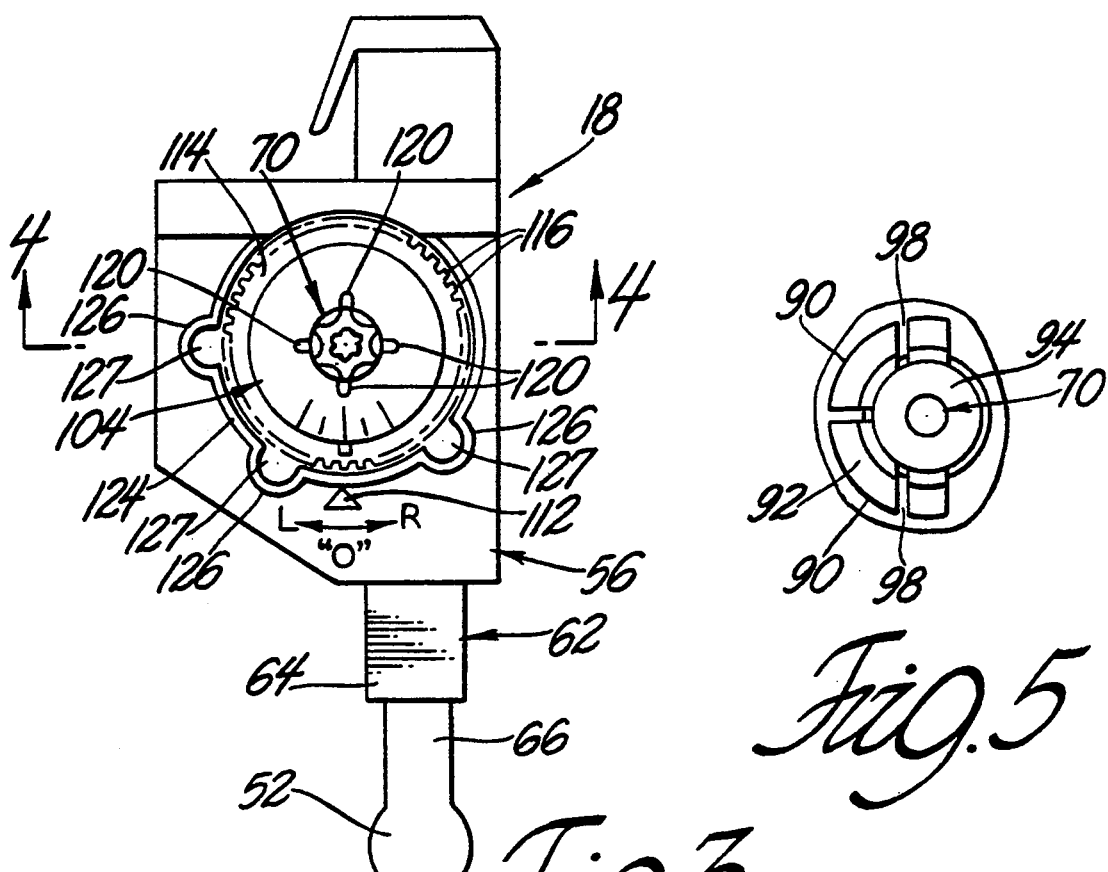
Fig.3
Fig.5
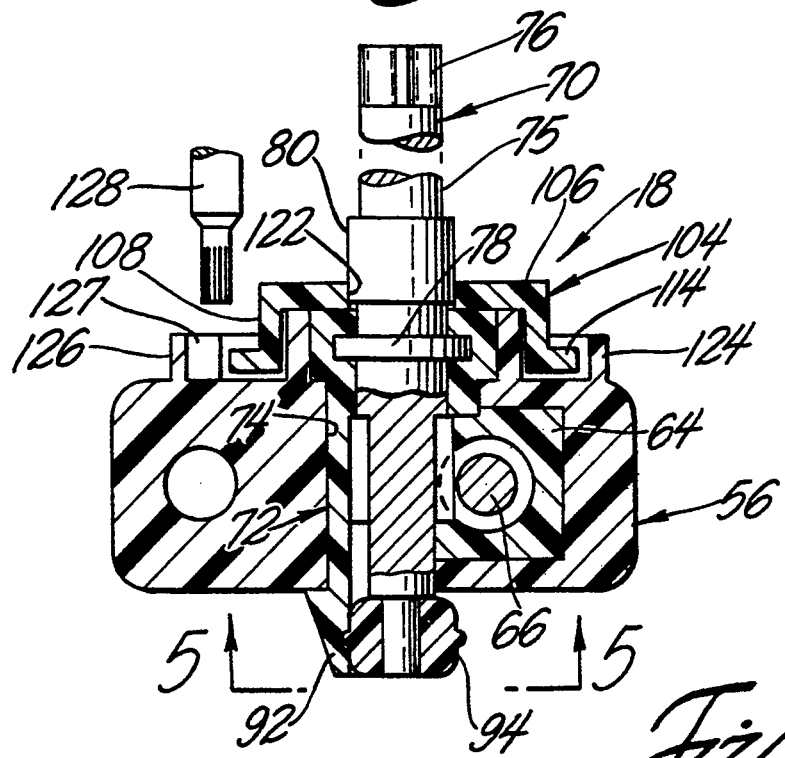
Fig.4

VEHICLE HEADLAMP ASSEMBLY

This invention concerns headlamps in general and, more particularly, relates to a vehicle headlamp having an adjustment device for providing fore and aft adjustable movement of one end of the headlamp and that includes indicia and a pointer indicator which can be repositioned relative to the indicia to indicate the correct aimed position of the headlamp and afterwards can be recalibrated if the need should arise.

BACKGROUND OF THE INVENTION

Vehicle headlamps are currently designed so as to permit on-board headlamp aiming by providing level devices on the headlamp that provide a visual indication when the headlamp is properly aimed. In addition, current government regulations require some form of indicator to be provided on the headlamp that will permit one to observe readily when the headlamp is out of aim in the horizontal plane and allow the headlamp to be manually repositioned to the correct aimed position. To this end, various types of headlamp adjustment devices incorporating recalibration features have heretofore been proposed for allowing a person to re-aim the headlamp if the latter should move out of the aimed position due to vibrations or other causes. One example of a headlamp having a headlamp adjustment device with a recalibration arrangement can be seen in U.S. Pat. No. 5,063,480, issued on Nov. 5, 1991 in the name of McMahan et al and assigned to the assignee of this invention. Other examples of such headlamps can be seen in U.S. Pat. No. 5,077,642 issued Dec. 31, 1991 to Lisak; U.S. Pat. No. 5,091,829 issued Feb. 25, 1992 to Hendrischk et al; U.S. Pat. No. 5,150,958 issued Sep. 29, 1992 to Miyazawa et al; U.S. Pat. No. 5,186,531 issued on Feb. 16, 1993 to Ryder et al; and U.S. Pat. No. 5,197,799 issued on Mar. 30, 1993 to Dehaene.

SUMMARY OF THE INVENTION

The present invention is directed to a headlamp assembly employing an adjustment device having a function similar to the function provided by the adjustment devices disclosed in the above-mentioned patents but differing therefrom in that it utilizes a disk member having teeth formed on the periphery thereof for achieving manual repositioning of the disk member, and the teeth are shielded by a wall so as to prevent accidental movement of the disk member after the latter is adjusted to indicate the headlamp aimed position to an observer. More specifically, the headlamp assembly according to the present invention is mounted on a support panel and includes a lamp unit supporting a light source. A first adjustment device and a second adjustment device are located between the support panel and the lamp unit for adjusting the lamp unit in a vertical plane and in a horizontal plane, respectively, for aiming the light beam emitted by the light source. The second adjustment device comprises a housing secured to the support panel and includes a shaft member supported within the housing for axial movement relative thereto. A ball pivot is carried by the shaft member and is connected to one end of the headlamp unit. In addition, a driver member is provided which has one end thereof drivingly connected to the shaft member. The driver member is supported in the housing for rotation about an axis perpendicular to the longitudinal axis of the shaft member and has the other end thereof formed with a drive head which, when rotated, causes simultaneous axial movement of the shaft member resulting in movement of the lamp unit fore and aft in the horizontal plane for aiming purposes. A cylindrical contact surface is formed on the driver member between the drive head and the aforementioned one end of the driver member. In order to realize recalibration of the headlamp unit, a zero ("0") marking is provided on the housing for indicating the initial adjusted aimed position of the lamp unit in the horizontal plane. The position indicator is mounted on the driver member for adjustable movement relative thereto and has a pointer formed therewith so that upon establishing the desired aimed position of the lamp unit by rotating the driver member, the position indicator is afterwards moved relative to the driver member to position the pointer in line with the zero ("0") marking to thereby indicate to an observer that the headlamp is correctly aimed in the horizontal plane. In the preferred form, the position indicator comprises a disk member having a circular opening formed therein which defines an annular contact surface. The disk member is mounted on the driver member with the annular contact surface of the disk member frictionally engaging the cylindrical contact surface of the driver member so the disk member can be rotated relative to the driver member and also rotated therewith. A plurality of teeth are formed on the periphery of the disk member that are adapted to be engaged by a hand tool for moving the pointer on the disk member in line with the zero ("0") marking after the headlamp unit is adjusted to the aimed position in the horizontal plane. In addition, an annular wall is formed with the housing and surrounds the disk member so as to shield the latter and prevent accidental movement of the disk member after the headlamp unit is aimed and the pointer is in line with the zero ("0") marking. Also, a guide opening is formed with the wall for accommodating the work end of the hand tool so as to permit the work end of the tool to mesh with the teeth of the disk member.

The objects of the present invention are to provide a new and improved vehicle headlamp assembly having an adjustment device that permits the headlamp unit to be aimed properly in a horizontal plane after final assembly of the vehicle and which includes a rotatable hand-tool movable position indicator mounted on the driver member of the adjustment device that allows the headlamp unit to be recalibrated if the headlamp unit should move out of the aimed position; to provide a new and improved headlamp assembly employing an adjustment device for the headlamp unit that is combined with a rotatable recalibration arrangement that includes a position indicator in the form of a disk member provided with teeth at its periphery and in which the teeth of the disk member are shielded by a wall so as to prevent accidental movement of the disk member when the latter is positioned to indicate the aimed position of the headlamp in the horizontal plane; to provide a new and improved vehicle headlamp assembly which includes an adjustment device that serves to move the headlamp unit fore and aft in a horizontal plane and is combined with a position indicator frictionally supported on the driver member of the adjustment device in a manner which allows the position indicator to rotate with the driver member when the latter is rotated and also allows the position indicator to be rotated by a hand tool without causing rotation of the driver member or requiring any manual restraining force to be applied to the driver member; and to provide a new and improved vehicle headlamp assembly having an adjustment device for the vehicle headlamp unit that is capable of adjusting the position of the headlamp unit in a horizontal plane and is combined with a recalibration arrangement having a rotatable position indicator that cooperates with a zero ("0") marking on the housing of the adjustment device for allowing an observer to determine if the headlamp unit has moved out of the aimed position.

Other objects and advantages of the present invention will be more apparent from the following detailed description when taken with the drawings in which:

BRIEF DESCRIPTION OF THE DRAWINGS

FIG. 3 is an enlarged plan view of the adjustment device incorporated with the headlamp assembly seen in FIGS. 1 and 2;

FIG. 4 is a sectional view taken on line 4—4 of FIG. 3;

FIG. 5 is a partial view of the bottom end of the adjustment device taken on line 5—5 of FIG. 4.

DETAILED DESCRIPTION OF THE INVENTION

Figure 1:
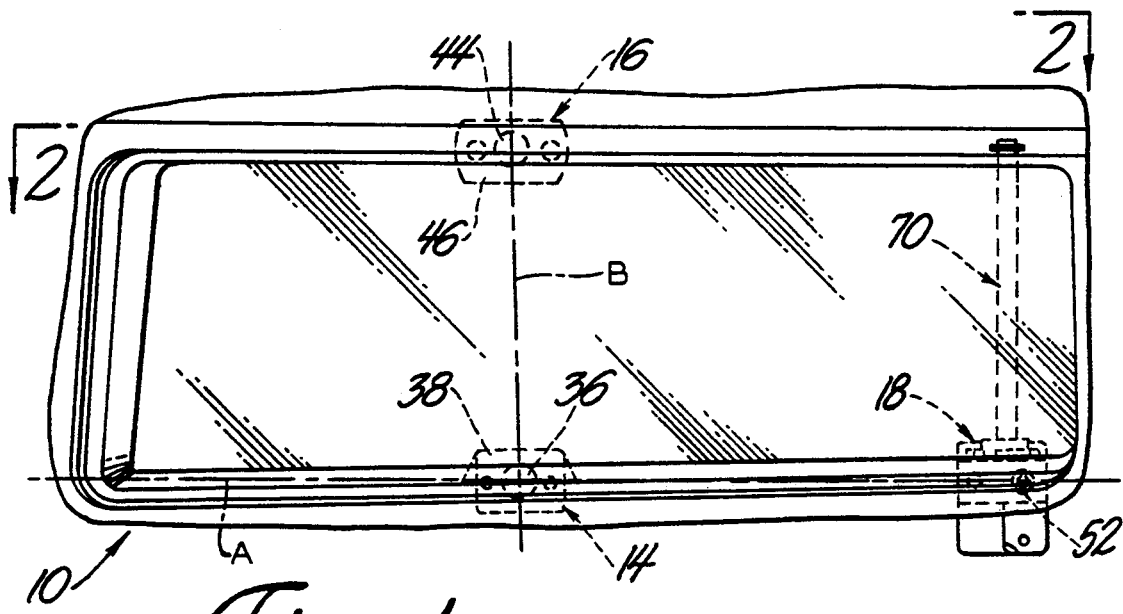
FIG. 1 is a front elevational view of a headlamp assembly combined with an adjustment device in accordance with the present invention.
Figure 2:
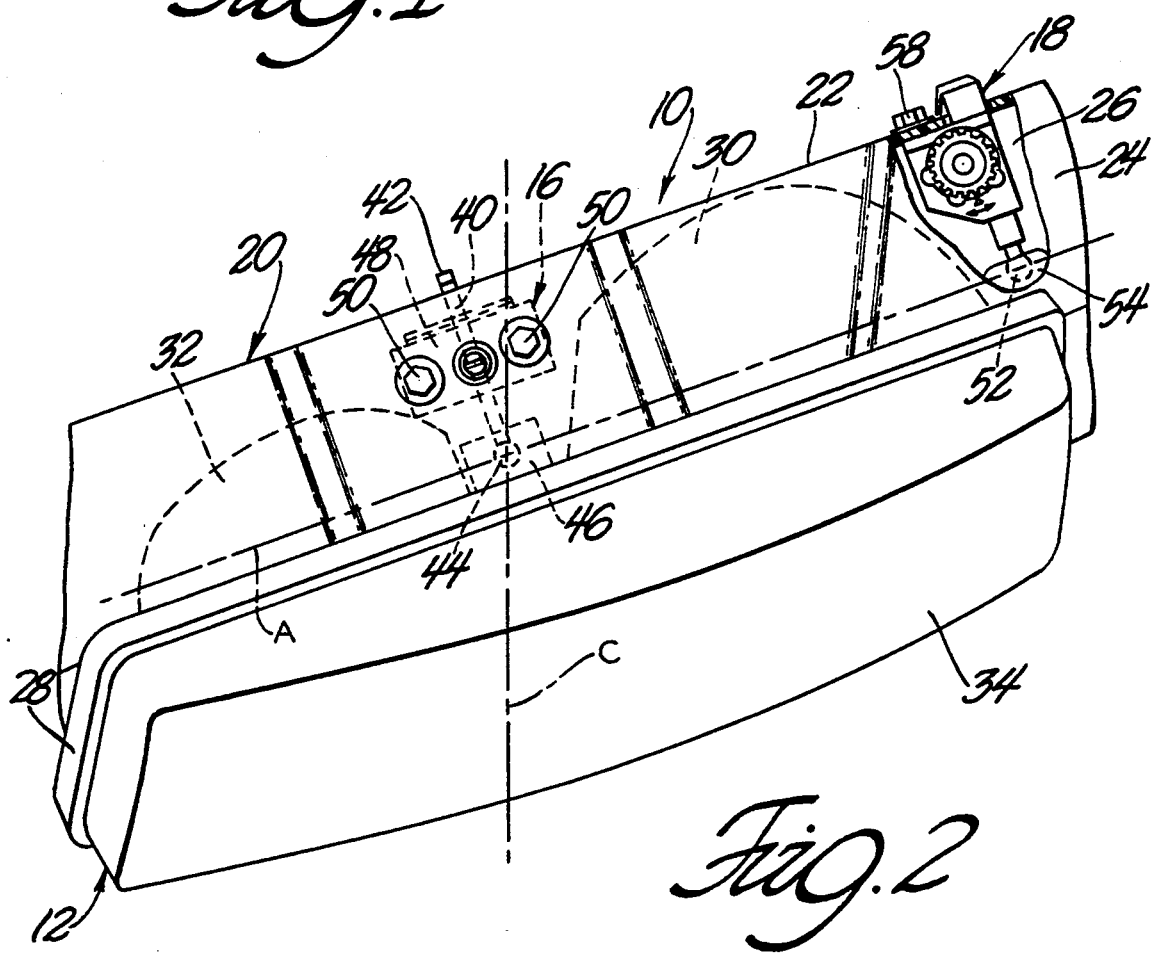
FIG. 2 is a plan view of the headlamp assembly taken on line 2—2 of FIG. 1.

Referring now to the drawings and more particularly to FIGS. 1 and 2 thereof, a headlamp assembly 10 for a motor vehicle is shown of the replaceable light bulb composite type. The headlamp assembly 10, according to the present invention, includes a lamp unit 12, a fixed ball pivot member 14 combined with an adjustment device 16 for lamp positioning about a horizontal aim axis "A" and an adjustment device 18 for lamp positioning about a vertical aim axis "B". The ball pivot member 14 and the adjustment devices 16 and 18 are mounted on a support panel 20 made of a plastic material and fastened to the sheet metal structure (not shown) at the front end of the motor vehicle. By having the ball pivot member 14 and the adjustment devices 16 and 18 mounted on the support panel 20, the entire assembly can be shipped as a self-contained unit to a vehicle manufacturer and thereafter be mounted to a the sheet metal structure at the front end of a motor vehicle so as to permit selective adjustable movement of the lamp unit 12 for aiming purposes in a horizontal plane containing the horizontal aim axis "A" and in a vertical plane containing the vertical axis "B". In the alternative, the support panel 20 can be a structural part of the vehicle so that the ball pivot member 14 and the adjustment devices 16 and 18 combined with the lamp unit 12 are shipped as a unit to the vehicle manufacturing plant for installation on the vehicle.

As seen in FIG. 2, the support panel 20 includes a back wall 22 integral with a pair of vertically spaced, generally horizontal top and bottom walls 24 and 26, respectively, to which are fastened the ball pivot member 14 and the adjustment devices 16 and 18 which connect the lamp unit 12 to the support panel 20 and provide repositioning of the lamp unit 12 about the aforementioned horizontal aim axis "A" and the vertical aim axis "B".

The lamp unit 12 includes a plastic reflector member 28 formed with a pair of side-by-side parabolic cavities 30 and 32, the inner concave surface of each of which is aluminized so as to project a light beam forwardly and substantially parallel to an axis "C" seen in FIG. 2. The axis "C" is parallel to the longitudinal center axis of the associated vehicle (not shown) and the headlamp assembly 10 would be the right-hand unit when looking at the front end of the vehicle as seen in FIG. 1. It will be noted that the angled position of the lamp unit 12 is due to the rounded streamlined front end design currently popular with motor vehicles. Also, although not shown, it will be understood that each of the parabolic cavities 30 and 32 is provided with a single filament replaceable bulb located so as to cause the associated parabolic concave surface to project a light beam forwardly of the vehicle. The light bulb in the cavity 30 is provided with a filament located so as to allow the associated aluminized parabolic surface to project the so-called low beam when energized while the light bulb in the cavity 32 projects the so-called high beam when the filament thereof is energized. In addition, the reflector member 28 has its front end closed by a glass or plastic lens 34, the rear marginal portion of which is sealingly received by a channel (not shown) provided around the entire margin of the front portion of the reflector member 28. Thus, the lamp unit 12 is actually two separate headlamps, a low beam unit and a high beam unit, joined together so as to facilitate the aiming of the lamps through the adjustment devices 16 and 18.

As alluded to hereinbefore, the ball pivot member 14 and the adjustment devices 16 and 18 serve to support the lamp unit 12 and allow selective positioning thereof about the horizontal aim axis "A" and the vertical aim axis "B". It will be noted that the ball pivot member 14 takes the form of a ball stud, the rear end of which is fixed by a bracket or the like (not shown) to the back wall 22 of the support panel 20 and the front end of which is formed with a ball pivot 36 received within a ball socket 38 attached to the lower rear of the reflector member 28 in the manner illustrated in U.S. Pat. No. 4,959,758, issued on Sep. 25, 1990 to Filosa et al and assigned to the assignee of this invention. Thus, the ball pivot 36 provides a fixed pivot point at the intersection of the horizontal aim axis A and the vertical aim axis B about which the lamp unit 12 can be adjusted by the adjustment devices 16 and 18.

In this regard, the adjustment device 16 includes a threaded shaft 40, the rear end of which is formed with a drive head 42 and the front end of which is formed with a ball pivot 44. As in the case of the ball pivot member 14, the ball pivot 44 is received within a ball socket 46 which, in this instance, is attached to the upper end of the reflector member 28. The shaft 40 is threadably received within a housing 48 secured to the top wall of the support panel 20 by a pair of cap screws 50 so that rotation of the drive head 42 results in longitudinal movement of the lamp unit 12 about the horizontal aim axis "A" which passes through the center of the ball pivot 36 and the center of a ball pivot 52 which, as seen in FIG. 2, forms a part of the adjustment device 18 and is connected to the reflector member 28 by a ball socket 54.

The adjustment device 18 incorporated in the headlamp assembly 10 is intended to provide fore and aft movement of the outboard end of the lamp unit 12 resulting in adjustable positioning and aiming thereof about the vertical aim axis "B". In addition, the adjustment device 18 is provided with a recalibration arrangement which permits an observer to readily determine when the lamp unit 12 is out of proper aim and, by use of a hand tool, quickly return the lamp unit 12 to the aimed position.

More specifically, and as seen in FIGS. 3 through 6, the adjustment device 18 includes a plastic housing 56 which is fixed to the back wall 22 of the support panel 20 by one or more cap screws 58. The housing 56 is provided with a longitudinally extending bore 60 which is square in cross section and serves to accommodate a slide member 62 which, as hereinafter will be explained, is movable relative to the housing 56. The slide member 62 consists of a block member 64 made of plastic which is also square in cross section and in which is secured an elongated metal shaft 66. The block member 64 is formed with a cut-out portion 68 which exposes a plurality of helical threads 69 formed on the shaft 66. The shaft 66 is nonrotatably secured within the block member 64 so that both the shaft 66 and the block member 64 are movable as a single unit longitudinally relative to the housing 56 when located in the opening 60.

Figure 6:
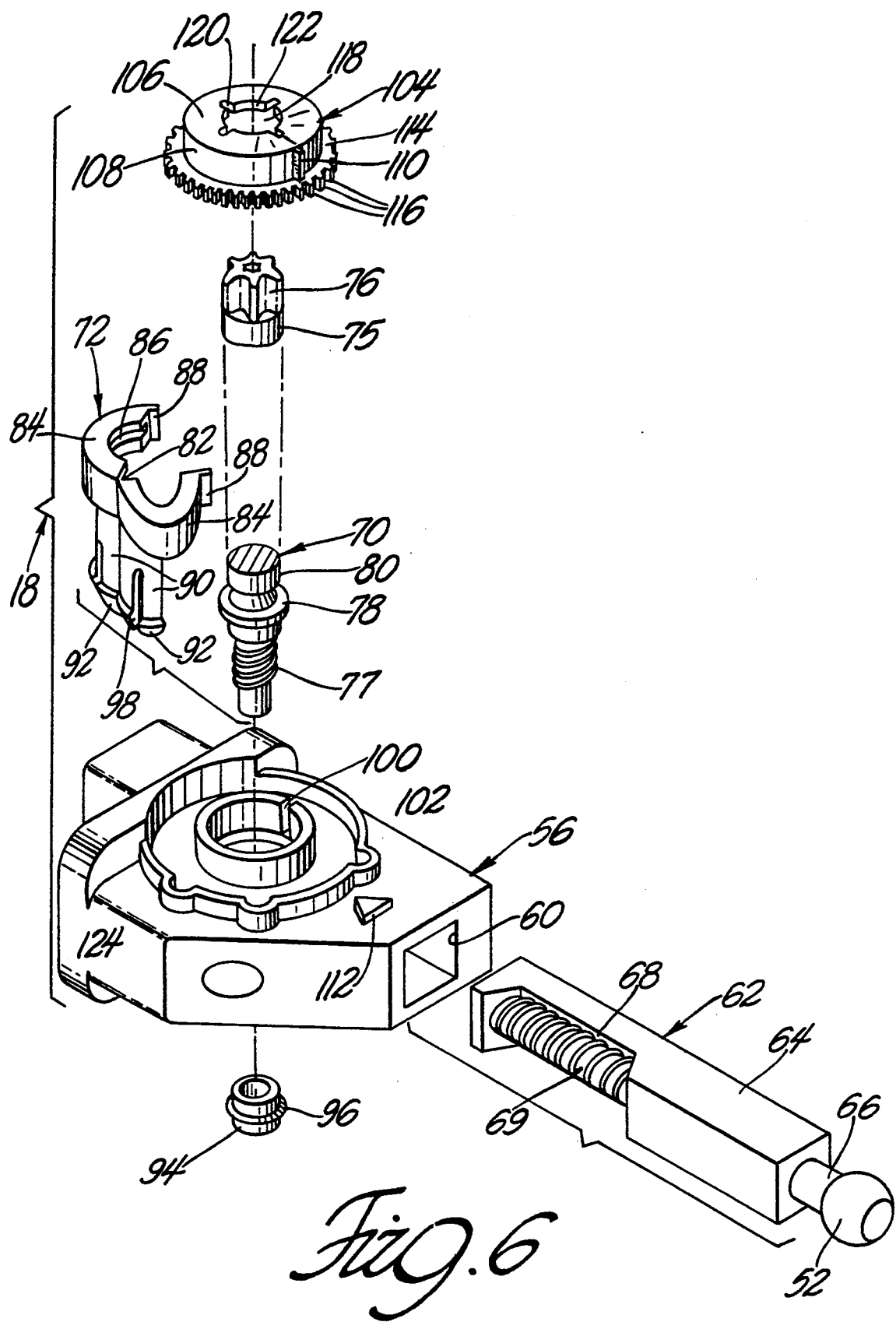
FIG. 6 is an exploded view showing the various parts of the adjustment device seen in FIGS. 1 through 5.

Movement of the slide member 62 relative to the housing 56 is realized through a drive member 70 rotatably mounted in a bushing 72 which, in turn, is located within a stepped vertically orientated bore 74 formed in the housing 56. As best seen in FIGS. 4 and 6, the driver member 70 takes the form of a shaft 75, the lower end of which is formed with helical threads which mesh with the threads of the shaft 66 mounted in the block member 64. The upper end of the shaft 75 is provided with a head 76 having teeth formed thereon. A radially outwardly extending flange 78 is formed on the shaft 75 just above the threads 77, and a cylindrical contact surface 80 is formed on the shaft 75 above the flange 78.

The bushing 72 is made of plastic and includes two pans connected by a living hinge 82. Each part of the bushing 72 is a mirror image of the other with the upper portion of each taking the form of a semi-circular section 84 provided with a semi-circular groove 86. In addition, each section 84 has the free end thereof provided with a tab 88 while the lower end of each section 84 is formed with a depending leg 90 terminating with a tapered lip 92.

During assembly of the bushing member 72 with the driver member, the two parts of the bushing member 72 are separated from each other as seen in FIG. 6, and the flange 78 of the driver member 70 is located within the groove 86 of one of the semi-circular sections 84 after which the other semi-circular section 84 is rotated about the living hinge 82 to enclose the driver member 70 and have the tabs of the two sections in contact with each other. At this point, the slide member 62 will be located in the bore 60 with the cut-out portion 68 facing the stepped bore 74, and the combined bushing 72 and driver member 70 are inserted into the stepped bore 74 and pushed therein until the tapered lip 92 snaps into the position seen in FIG. 4. A plastic cylindrical collar 94 is then press-fitted onto the lower end of the driver member 70 causing a radially outwardly extending ring 76 formed on the collar to snap into an annular groove in the legs 90 of the bushing 72 to lock the driver member 70 in the housing 56 with the threads 77 thereof in engagement with the threads 69 of the slide member 62. In this connection, it will be noted that each leg 90 of each part of the bushing 72 is a quarter section formed with a slit 98 so when the bushing 72 is wrapped around the driver member 70, a half section of helical threads 77 on the driver member 70 is exposed for engagement with the threads 69 of the slide member 62. It will also be noted that the combined tabs 88 of the sections 84 serve as a locator which is received by a vertically oriented slot 100 formed in an upstanding ring-shaped boss 102 formed with the housing 56. Thus, when the tabs 88 are located in the slot 102, the exposed threads 77 of the driver member will properly engage the threads 64 of the slide member 62 so that rotation of the driver member 70 results in longitudinal movement of the slide member 62. The longitudinal movement of the slide member 62, in turn, causes tore or aft movement of the ball pivot 52, resulting in adjustable movement of the lamp unit 12 about the vertical axis "B" and in a horizontal plane. An adjustment device 18 of the type described above can be seen in U.S. Pat. No. 5,193,905, issued on Mar. 16, 1993 to Edwards et al.

The recalibration arrangement provided on the adjustment device 18 includes a plastic disk member 104 which, as seen in FIG. 4, is hat-shaped in cross section. As best seen in FIGS. 3, 4 and 6, the disk member 104 is formed with a planar top section 106 which is integral with a depending skirt section 108 having a vertically oriented pointer 110 formed thereon. As will be more fully explained hereinafter, when the pointer 110 is in line with a zero ("0") marking located on the housing 56 and taking the form of an arrow 112 as seen in FIG. 3, the lamp unit 12 will be in the correct aimed position in the horizontal plane. The skirt section 108 is integral with a radially outwardly extending circular flange 114 having a plurality of teeth 116 formed on the periphery thereof. A centrally located circular opening 118 is formed in the top section 106 of the disk member 104 that connects with four identical U-shaped slots 120 located along a pair of axes arranged orthogonally and intersecting at the center of the opening 118. The slots 120 define four circumferentially spaced arcuate contact surfaces 122 lying on a common circle which frictionally engage the cylindrical contact surface 80 of the driver member 70.

The flange 114 of the disk member 104 is encircled by a circular upstanding wall 124 which is integral with the housing 56. The wall 124 serves as a shield to prevent the teeth 116 formed on the disk member 104 from being accidentally contacted and causing the disk member 104 from being inadvertently moved, causing the pointer 110 to move relative to the zero marking arrow 112 after the headlamp unit 12 has been aimed. The wall is also formed with three identical circumferentially spaced and radially outwardly extending bulges 126 each of which defines a semi-circular opening 127 for the work end 128 of a hand tool having multi-starred head teeth such as seen in FIG. 4. Thus, when the multi-starred teeth of the hand tool are inserted into one of the openings 127, the multi-starred teeth engage the teeth 116 of the flange 114 and, upon manual rotation of the hand tool, the disk member 104 can be rotated relative to the driver member 70.

It will be noted that the adjustment device 18 is designed so that the bushing 72 provides a predetermined frictional restraining force on the driver member 70 which is greater than the frictional restraining force existing between contact surfaces 80 and 122 of the disk member 104 and the driver member 70. In other words, the frictional force provided by the engaging contact surfaces 80 and 122 of the disk member 104 and the driver member 70 is such that when the driver member 70 is rotated using a hand tool, the disk member 104 will rotate with the driver member 70 as if the two were one unit. On the other hand, the frictional force applied by the bushing 72 is such that when the disk member 104 is rotated using the hand tool as explained above, the driver member 70 maintains its original position and does not rotate with the disk member 104.

As seen in FIG. 3, the pointer 110 is located in line with the zero marking arrow 112 on the housing 56 and, accordingly, indicates to the observer that the lamp unit 12 is in the properly aimed position in the horizontal plane. It is intended that this properly aimed position in the horizontal plane be achieved during final inspection of the vehicle in the vehicle manufacturer's assembly plant. In order to do so, the vehicle is driven onto a level platform, the lamp unit 12 is energized, and as is conventional, a mechanical aimer is used to obtain the initial aimed position of the lamp unit 12 in the horizontal plane by using a hand tool placed on the head 76 of the driver member 70 of the adjustment device 18 for causing fore or aft movement of the slide member 62. As the driver member 70 is rotated, the disk member 104 rotates with the driver member as explained above. Once the aimed position is obtained, a multi-starred head of a screw driver is placed within one of the guide openings 127 of the wall 124 and the pointer 110 of the disk member 104 is aligned with the arrow 112 on the housing 56. After the vehicle is delivered to the customer, if the lamp unit 12 should for some reason move out of the aimed position in the horizontal plane due to vibrations or inadvertent rotation of the driver member 70, the pointer 110 will be displaced relative to the zero marking arrow 112. Once this is observed, it will be a simple matter to return the lamp unit 12 to the zero marking by applying the proper hand tool to the head 76 of the driver member 70 and causing the slide member 62 to move in the proper direction to allow the pointer 110 to once again be aligned with the zero marking arrow 112 on the housing 56.

Finally, it will be noted that the cut-out portion 68 of the block member 64 is designed so as to expose only enough threads 69 on the shaft 66 so that the driver member 70 can make slightly less than a full 360 degree revolution. In other words, the opposed ends of the cut-out portion serve as stops which limit the excursion of the slide member 62 relative to the housing 56 and also prevent a full 360 degree rotation of the driver member about its rotational axis. As should be apparent, if the driver member 70 were capable of rotating more than 360 degrees, it would not be possible to determine from observing the position of the pointer relative to the zero marking arrow (when the lamp is out of adjustment) whether the lamp unit 12 can be returned to the aimed position by merely rotating the driver member 70 directly to the zero marking or whether a complete 360 degree revolution is first necessary before the correct aimed position is achieved. In this instance, by assuring that the driver member 70 is limited to less than a 360 degree rotation, this problem is eliminated.

Various changes and modifications can be made in the construction of this headlamp assembly without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a headlamp assembly having a lamp unit mounted on a support panel and supporting a light source, a first adjustment device and a second adjustment device located between said support panel and said lamp unit for adjusting said lamp unit in a vertical plane and in a horizontal plane, respectively, for aiming a light beam emitted by said light source, said second adjustment device comprising a housing secured to said support panel and supporting an axially movable shaft which provides a ball pivot for one end of said headlamp unit, a driver member rotatably supported in said housing and drivingly connected to said pivot member, said driver member and said shaft each having screw threads formed thereon which engage each other so that rotation of said driver member causes simultaneous axial movement of said shaft and results in movement of said lamp unit fore and aft in said horizontal plane for aiming purposes, a zero ("0") marking on said housing for indicating an adjusted aim position of said lamp unit in said horizontal plane, a position indicator mounted on said driver member for adjustable movement relative thereto and having a pointer formed therewith so that upon establishing the desired aimed position of said lamp unit by rotating said driver member, said position indicator is located with said pointer in line with said zero ("0") marking so as to indicate to an observer the aimed position of said headlamp in said horizontal plane, said position indicator comprising a disk member having the outer periphery thereof formed with a plurality of teeth, an annular wall formed with said housing and surrounding said disk member so as to shield the latter and prevent accidental movement of said position indicator after said headlamp unit is aimed and said pointer is in line with said zero ("0") marking on said housing.

2. In combination with a headlamp assembly having a lamp unit supporting a light source, a first adjustment device and a second adjustment device located between said support panel and said lamp unit for adjusting said lamp unit in a vertical plane and in a horizontal plane, respectively, for aiming a light beam emitted by said light source, said second adjustment device comprising a housing secured to said support panel, a shaft supported by said housing for axial movement relative thereto, a ball pivot mounted on said shaft and connected to one end of said headlamp unit, a driver member having one end thereof drivingly connected to said shaft and supported in said housing for rotation about an axis which is perpendicular to the longitudinal center axis of said shaft, said driver member having the other end thereof formed with a drive head which when rotated causes simultaneous axial movement of said shaft and results in movement of said lamp unit fore and aft in said horizontal plane for aiming purposes, a cylindrical contact surface formed on said driver member between said drive head and said one end of said driver member, a zero ("0") marking on said housing for indicating an adjusted aim position of said lamp unit in said horizontal plane, a position indicator mounted on said driver member for adjustable movement relative thereto and having a pointer formed therewith so that upon establishing the desired aimed position of said lamp unit by rotating said driver member, said position indicator is located with said pointer in line with said zero ("0") marking so as to indicate to an observer the aimed position of said headlamp in said horizontal plane, said position indicator comprising a disk member having a circular opening formed therein which defines an annular contact surface, said disk member being mounted on said driver member with said annular contact surface of said disk member frictionally engaging said cylindrical contact surface of said driver member so that said disk member can be rotated relative to said disk member and also rotate therewith, said disk member having the outer periphery thereof formed with a plurality of teeth, an annular wall integrally formed with said housing and surrounding said disk member so as to shield the latter and prevent accidental movement of said position indicator after said headlamp unit is aimed and said pointer is in line with said zero ("0") marking on said housing.

3. In combination with a headlamp assembly having a lamp unit supporting a light source, a first adjustment device and a second adjustment device located between said support panel and said lamp unit for adjusting said lamp unit in a vertical plane and in a horizontal plane, respectively, for aiming a light beam emitted by said light source, said second adjustment device comprising a housing secured to said support panel, a shaft supported by said housing for axial movement relative thereto, a ball pivot mounted on said shaft and connected to one end of said headlamp unit, a driver member having one end thereof drivingly connected to said shaft and supported in said housing for rotation, said driver member having the other end thereof formed with a drive head which when rotated causes simultaneous axial movement of said shaft and results in movement of said lamp unit fore and aft in said horizontal plane for aiming purposes, a cylindrical contact surface formed on said driver member between said drive head and said one end of said driver member, a zero ("0") marking on said housing for indicating an adjusted aim position of said lamp unit in said horizontal plane, a position indicator mounted on said driver member for adjustable movement relative thereto and having a pointer formed therewith so that upon establishing the desired aimed position of said lamp unit by rotating said driver member, said position indicator is located with said pointer in line with said zero ("0") marking so as to indicate to an observer the aimed position of said headlamp in said horizontal plane, said position indicator comprising a disk member having a circular opening formed therein which defines an annular contact surface frictionally engaging said cylindrical contact surface of said driver member so that said disk member can be rotated relative to said disk member and also rotate therewith, said disk member having the outer periphery thereof formed with a plurality of teeth adapted to be engaged by a hand tool for moving said pointer of said disk member in line with said zero ("0") marking, an annular wall formed with said housing and surrounding said disk member so as to shield the latter and prevent accidental movement of said position indicator after said headlamp unit is aimed and said pointer is in line with said zero ("0") marking on said housing, and said wall having a guide opening formed therewith for accommodating a work end of said hand tool so as to permit said work end to mesh with the teeth of said disk member.

4. The combination set forth in claim 3 wherein said disk member is hat-shaped in cross section and is formed with a flange and said teeth are formed on said flange.

5. The combination set forth in claim 3 wherein said annular wall is formed with at least two circumferentially spaced guide openings for accommodating the work end of said hand tool.

6. The combination set forth in claim 5 wherein each of said guide openings formed with said annular wall for accommodating the work end of said hand tool is semicircular in configuration.

* * * * *